United States Patent Office 3,157,700
Patented Nov. 17, 1964

3,157,700
NEW SULFONYLUREAS
Paul Schmidt, Therwil, and Kurt Eichenberger and Max Wilhelm, Basel, Switzerland, assignors to Ciba Corporation, a corporation of Delaware
No Drawing. Filed Dec. 19, 1961, Ser. No. 160,651
Claims priority, application Switzerland, Dec. 23, 1960, 14,400/60; Oct. 20, 1961, 12,202/60
4 Claims. (Cl. 260—553)

The present invention relates to new sulfonylureas. More particularly it concerns sulfonylureas of the formula

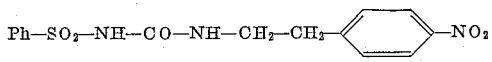

where Ph represents a phenyl radical—and their salts.

The aforementioned phenyl radical may be unsubstituted, monosubstituted or polysubstituted. Suitable substituents are, for example: Lower alkyl such as methyl, ethyl, propyl or isopropyl, butyl, pentyl or hexyl, hydroxyl, lower alkoxy such as methoxy, ethoxy, propoxy or butoxy, halogen-lower alkyl such as trifluoro-methyl or chloromethyl, nitro, halogen such as fluorine, chlorine or bromine, cyano or amino groups such as mono-lower alkylated or di-lower alkylated amino groups, for example methylamino, ethylamino, propylamino, dimethylamino, diethylamino, dipropylamino, butyleneimino or hexyleneimino groups, or acylated amino or hydroxyl groups such as lower alkanoylated, for example acetylated, propionylated or butyrylated amino or hydroxyl groups.

Salts of the new compounds are, for example, salts with bases, more especially with metals of Groups 1 and 2 of the Periodic Table, above all alkali metals and alkaline earth metals.

The new compounds possess valuable pharmacological properties; for example, after being orally administered once, they have a pronounced effect on lowering the blood sugar level in animals and human beings, this effect having a slow onset, but increasing steadily and only reaching the maximum much later. Consequently, they may be used as antidiabetics. Owing to the long duration and intensity of the effect on lowering the blood sugar level they are superior to other known antidiabetics.

Particularly valuable in this respect are $N^1$-para-toluenesulfonyl - $N^2$ - β-(para-nitrophenyl)-ethyl urea, $N^1$-para-chlorophenylsulfonyl-$N^2$-β-(para-nitrophenyl) - ethyl urea and $N^1$-benezenesulfonyl - $N^2$-β-(para-nitrophenyl)-ethyl urea.

The new compounds are manufactured by known methods.

A preferred method consists in reacting together compounds of the formula

Ph—SO$_2$—X and

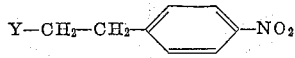

wherein one of the radicals X and Y represents a free amino group, if desired in the form of an alkali metal salt thereof, while the other stands for the isocyanate group of the formula

—N=C=O

Thus an isocyanate of the formula PH—SO$_2$—NCO may be reacted with β-(para-nitrophenyl)-ethylamine.

On the other hand, for example, a sulfonamide of the formula Ph—SO$_2$—NH$_2$ —if desired in the form of a metal salt, such as an alkali metal salt thereof—may be reacted with β-(para-nitrophenyl)-ethylisocyanate.

The process is carried out in the conventional manner in the presence or absence of diluents and/or condensing agents and/or catalysts, at room temperature or a lower or higher temperature, if desired under superatmospheric pressure.

The invention also includes any variant of the present process in which an intermediate obtainable at any stage of the process is used as starting material and the remaining step or steps is/are carried out, or in which the starting materials are used in the form of salts.

The starting materials are known or can be prepared by known methods.

Depending on the reaction conditions employed the new compounds are obtained in the free form or in the form of their salts. The salts can be converted into the free compounds in the conventional manner, for example by acidification. The free compounds can be converted in the conventional manner into their salts, such as salts with bases, for example ammonia or organic bases, above all into the aforementioned metal salts, for example the salts of sodium, potassium, calcium or magnesium.

The new compounds and their salts may be used, for example, in the form of pharmaceutical preparations containing them in admixture with a pharmaceutical organic or inorganic excipient suitable for enteral or parenteral administration. Suitable excipients are substances that do not react with the new compounds, such, for example, as water, gelatine, lactose, starch, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees, powders or suppositories, or in liquid form solutions, suspensions or emulsions.

The preparations contain advantageously 50–400 mg. of the active ingredient per dosage unit, preferably 150–250 mg. They are made by the conventional methods.

The following examples illustrate the invention.

EXAMPLE 1

A solution of 13 grams of β-(para-nitrophenyl)-ethylamine in 100 cc. of benzene is treated with 15 grams of para-toluenesulfonyl isocyanate in 50 cc. of benzene and the mixture is heated for one hour at 50° C. The crystalline precipitate formed is filtered off and dissolved at 80° C. in 2 N-sodium hydroxide solution. The solution is filtered through active carbon and acidified with hydrochloric acid, whereupon $N^1$-para-toluene-sulfonyl-$N^2$-β-(para-nitrophenyl)-ethyl urea of the formula

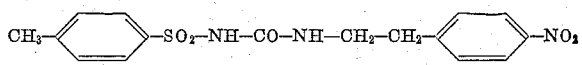

precipitates which melts at 174 to 175° C. after recrystallization from methanol.

EXAMPLE 2

To a suspension of 10 grams of ground and dried potassium carbonate in 100 cc. of acetone there are added 10 grams of para-chlorobenzene-sulfonamide and 12 grams of para-nitrophenylethyl isocyanate, and the whole is stirred for 4 hours at 50° C. The reaction mixture is evaporated in vacuo and then treated with 2 N-hydrochloric acid. A precipitate settles out which is filtered off and recrystallized from alcohol to yield $N^1$-para-chlorophenylsulfonyl-$N^2$-β-(para-nitrophenyl)-ethyl urea of the formula

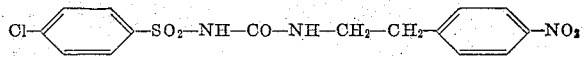

in the form of crystals melting at 154–155° C.

The β-(para-nitrophenyl)-ethyl isocyanate used as starting material may be prepared as follows:

Into a suspension of 50 grams of β-(para-nitrophenyl)-ethylamine hydrochloride in 400 cc. of toluene phosgene is introduced with stirring at 110° C. until the precipitate disappears. Distillation is then performed. The isocyanate boils at 153–158° C. under 0.3 mm. of pressure.

EXAMPLE 3

In an analogous manner to that described in Example 2 by reacting benzenesulfonamide with para-nitrophenyl-ethyl isocyanate there may be obtained N¹-benezenesulfonyl-N²-β-(para-nitrophenyl)-ethyl urea of the formula

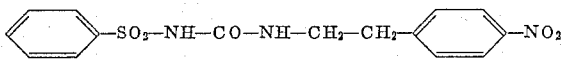

melting at 170–171° C.

EXAMPLE 4

Tablets containing 200 mg. of the active substance may be prepared, for example, with the following ingredients and in the following way:

| Ingredients: | Mg. |
|---|---|
| N¹-para-toluenesulfonyl - N² - β-(para-nitrophenyl)-ethyl urea | 200.0 |
| Lactose (100–150μ) | 207.0 |
| Potato starch | 182.0 |
| Colloidal silicic acid with hydrolysed starch | 10.0 |
| Glycerine | 1.5 |
| Magnesium stearate | 4.5 |
| Talc | 20.0 |

Method

N¹-para-toluenesoulfonyl - N² - β-(para-nitrophenyl)-ethyl urea is moistened with a glycerine solution of 1% strength and passed through a sieve with a 4.2 mm. mesh. The mixture, dried at 45° C., is then passed through a sieve of 0.75 mm. mesh and mixed with the remaining filling material and lubricant. After passing the mass through a sieve of 1.2 mm. mesh and working the mixture to a homogeneous mass, the mixture is compressed in the conventional manner into tablets of 625 mg. in weight and 11.5 mm. in diameter.

What is claimed is:

1. A member selected from the group consisting of a sulfonyl-urea of the formula

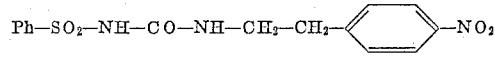

in which Ph is a member selected from the group consisting of phenyl, lower alkylphenyl and halogeno-phenyl, and the non-toxic alkali metal and alkaline earth metal salts thereof.

2. N¹-para-toluenesulfonyl - N² - β-(para-nitrophenyl)-ethyl urea.

3. N¹-para-chlorophenylsulfonyl - N²-β - (para-nitrophenyl)-ethyl urea.

4. N¹-benezenesulfonyl - N² - β - (para-nitrophenyl)-ethyl urea.

References Cited in the file of this patent

UNITED STATES PATENTS 3,013,072 McLamore et al. Dec. 12, 1961

FOREIGN PATENTS 602,092 Canada July 19, 1960

OTHER REFERENCES

Ruschig et al.: Arzn. Forsch., vol. 8, No. 7a, pp. 448–454 (1958).

Hokfelt et al.: J. of Med. and Pharm. Chem., vol. 5, No. 2, pages 231–239 (1962).